United States Patent
Rumbo et al.

(10) Patent No.: US 6,507,782 B1
(45) Date of Patent: Jan. 14, 2003

(54) AIRCRAFT CONTROL SYSTEM FOR REACHING A WAYPOINT AT A REQUIRED TIME OF ARRIVAL

(75) Inventors: Jim R. Rumbo, Glendale, AZ (US); Michael R. Jackson, Maple Grove, MN (US); Brian E. O'Laughlin, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/855,861

(22) Filed: May 14, 2001

(51) Int. Cl.$^7$ ............................................. G06F 15/50
(52) U.S. Cl. ...................... 701/121; 701/123; 701/204; 244/182
(58) Field of Search ................................ 701/123, 121, 701/204; 244/182

(56) References Cited

U.S. PATENT DOCUMENTS

| | | | | |
|---|---|---|---|---|
| 4,760,530 A | * | 7/1988 | Liden | 701/123 |
| 5,051,910 A | * | 9/1991 | Liden | 701/204 |
| 5,121,325 A | | 6/1992 | DeJonge | 701/123 |
| 5,408,413 A | | 4/1995 | Gonser et al. | 701/204 |
| 6,061,612 A | | 5/2000 | Sainthuile | |

FOREIGN PATENT DOCUMENTS

EP    0637787 A    2/1995

OTHER PUBLICATIONS

Lee, H.P. and Leffler, M.F., Development of the L–1011 Four–Dimensional Flight Management System, Nasa Contractor Report 3700, 1984, pp. 1–135.
Williams, David H., Fuel Penalties and Time Flexibility of 4D Flight Profiles Under Mismodeled Wind Conditions, NASA Technical Memorandum 89128, Mar. 1987, pp. 1–26.
Adams, J.D., "FMCS/TNAV Application In The FAA ATC System," 1987 Society of Automotive Engineers Conference, Seattle, Washington.
Adam, V. and Kohrs, R., "On Board Planning Of 4D–Trajectories," Institute of Flight Guidance, Chapter 16, pp. 1–12.
Buckham, C.A., "Computational Enahncements To A 4–D Algorithm," 1986 American Control Conference, Seattle, Washington, Jun. 18–20, 1986.
Burrows, J.W., "Fuel Optimal Aircraft Trajectories With Fixed Arrival Times," AIAA J. Guidance, vol. 6, No. 1, Jan.–Feb. 1983, pp. 14–19.
Burrows, J.W. and Chakravarty, A., "Time–Controlled Aircraft Guidance In Uncertain Winds and Temperatures," 1984 American Control Conference, Seattle, Washington.
Chakravarty, A., "Four–Dimensional Fuel–Optimal Guidance In The Presence Of Winds," Journal of Guidance, Control and Dynamics, vol. 8, No. 1, Jan.–Feb. 1985, pp. 584–93.
Ingle, G., "Prediction and Performance Aspects Of Flight Within 4–D Constraints," Defence Evaluation and Research Agency, Chapter 47, pp. 1–14.

(List continued on next page.)

Primary Examiner—William A. Cuchlinski, Jr.
Assistant Examiner—Marthe Y. Marc-Coleman

(57) ABSTRACT

The instant invention provides a system and method for controlling the flight of an aircraft to meet an RTA. The system comprises a speed profile generator that communicates with a trajectory generator to produce a speed profile signal that enables the aircraft to reach a waypoint substantially at a predetermined time. In the system of the instant invention, the speed profile generator receives a nominal speed command signal, a time error signal and a sensitivity signal. Based on these inputs, the speed profile generator produces a speed profile signal. The trajectory generator receives the speed profile signal and a required time of arrival signal. Based on these signals, the trajectory generator produces a time error signal and a sensitivity signal. This sensitivity signal represents the sensitivity of the time error signal to changes in the speed profile signal.

40 Claims, 6 Drawing Sheets

OTHER PUBLICATIONS

Liden, S., "Optimum 4–D Guidance For Long Flights," 1992 IEEE/AIAA Digital Avionics Systems Conference, Oct. 5–8, 1992, Seattle, Washington, pp. 1–6.

Liden, S., "Arrival–Time Guidance In Variable Winds," 1988 IEEE/AIAA Digital Avionics Systems Conference, Oct. 17–20, 1988, San Jose, California, pp. 1–9.

Sorenson, J.A. and Waters, M.H., "Airborne Method To Minimize Fuel With Fixed Time–Of–Arrival Constraints," Journal of Guidance and Control, vol. 4, May–Jun. 1981, pp. 348–49.

Velle, J.I. and Walters, C.G., "Aircraft And Avionics Technology –A Fuel Efficient Four–Dimensional Guidance System," 1984 Aviation Fuel Conservation Symposium, Sep. 10–11, 1984, Washington, D.C. pp. 1–17.

Vicroy, D.D., "Guidance Concepts For Time–Based Flight Operations," AGARD AG 301, Chapter 24, pp. 1–12, 1990.

Williams, D.H., "Impact of Mismodeled Idle Engine Performance On Calculation And Tracking Of Optimal 4–D Descent Trajectories," 1986 American Control Conference, Jun. 18–20, 1986, Seattle, Washington, pp. 681–686.

Williams, D.H. and Green, S.M., "Airborne Four–Dimensional Flight Management In A Time–Based Air Traffic Control Environment," NASA TM–4249, Mar. 1991, pp. 1–33.

Williams, D.H. and Knox, C.E., "4D Descent Trajectory Techniques Under Realistic Operating Conditions," AGARD–AG–301, Chapter 25, pp. 1–22.

* cited by examiner

AIRCRAFT CONTROL SYSTEM FOR REACHING A WAYPOINT AT A REQUIRED TIME OF ARRIVAL

FIELD OF THE INVENTION

This invention relates to systems for planning and adjusting the mission profiles of aircraft and more particularly to systems and methods for planning the mission profiles of aircraft so that the controlled aircraft reaches a predetermined waypoint at a required time of arrival.

BACKGROUND OF THE INVENTION

In today's world, transportation by aircraft is extremely popular. This popularity has resulted in dramatic increases in air traffic and caused a variety of related difficulties including airborne traffic congestion and overburdening of aircraft ground support facilities. It is estimated that air traffic will continue to grow, causing the further exacerbation of these problems. To effectively manage aircraft traffic congestion, both in the air and on the ground, various authorities are exercising, or are seeking to exercise, increasing control over the operation of aircraft within their jurisdictions. This increasing level of control already extends to the assignment of aircraft flight paths and the imposition of specific time constraints upon aircraft operators.

Contemporaneously with the increase in flight volume, competition between commercial aircraft operators has also increased and is expected to increase further. This competition has created a situation where aircraft operators must exercise tight control over their operating expenses to remain profitable. Experience has shown that aircraft operating expenses are significantly impacted by consumption of fuel, as well as utilization of aircraft equipment, flight crew and other personnel. These, in turn, are significantly impacted by factors that combine to form the aircraft mission including the flight duration, flight speed, flight path, and takeoff and landing cycles. Thus, to effectively control operating costs, aircraft operators are demanding increased control over the planning and execution of their missions. It naturally follows then, that aircraft operators who enjoy greater autonomy and control over the planning and execution of their missions will be rewarded in the marketplace.

Typically, an aircraft operator's use of an aircraft may be described in terms of the execution of a series of missions, each mission comprising one takeoff from an origination location, one landing at a destination location, and a period of airborne flight between the takeoff and the landing. The set of flight positions and flight velocities traversed by the aircraft in the performance of a particular mission may then be described as a mission profile. Typically, the position of an aircraft during flight may be described in terms of a three dimensional translation from some arbitrary reference point. Typically, the aircraft's latitude, longitude and altitude are used. Further, the aircraft's orientation may be described in terms of its angular rotation about three reference axis, for example, pitch, yaw, and roll. The aircraft's velocity may be described as a vector having a direction or heading component and a magnitude or speed.

The portion of the mission between the takeoff and the landing may be further described in terms of a series of flight phases. The first of these phases is typically referred to as the climb phase. In climb, the vertical component of the aircraft's position increases substantially as the aircraft ascends from the takeoff elevation to a cruise altitude. A second phase is frequently referred to as cruise. In the cruise phase, the vertical component of the aircraft's position remains relatively constant at the cruise altitude. Cruise is typically the phase during which the aircraft occupies the majority of the duration of its missions. A third phase is commonly referred to as descent, wherein the vertical component of the aircraft's position decreases substantially as the aircraft descends from the cruise altitude to an approach altitude. An approach phase typically follows descent and is followed by the landing phase. Typically, an aircraft in the approach phase follows a flight path that is substantially level or that is declining in altitude. The altitudes followed in approach are typically between 5000 and 10000 feet above sea level, often depending on the elevation of the destination airport.

In approach, aircraft has entered the near proximity of their destination airport. This proximate region is called the terminal area. The terminal area extends approximately 30 miles in radius from most major airports and is defined in large part by predetermined boundaries prescribed by the relevant authority, in some part by the range of the airport's terminal approach radar. When an aircraft enters the terminal area, authority for its control transfers from an air traffic control center to the terminal area controller. The point at which control is transferred is called the transition point.

In addition to exhibiting the distinctive characteristics described above, each phase may also entail aircraft operational limitations that are inherent in the specific combination of the aircraft and its powerplant. These aircraft operational limitations may be influenced by a variety of factors including aircraft structural considerations such as wing loading and flutter; aircraft powerplant considerations such as thrust, fuel consumption, life, air-starting and/or bleed pressure; aircraft aerodynamic considerations such as lift, drag and stall; as well as system control and stability characteristics. These aircraft operational limitations have the capability to inhibit aircraft autonomy and affect aircraft controllability.

As briefly mentioned above, aircraft operators typically desire to retain or regain maximum autonomy with respect to the planning and execution of their missions. Aircraft operators who enjoy full aircraft autonomy are free to select and/or adjust the combination of flight positions and velocities that make up their mission profile to suit their individualized objectives. Those objectives may relate to considerations such as time, payload, position, and/or cost. Operators enjoying full autonomy will be more capable to continually improve their operating efficiencies as well as their payload capacity, range and/or profitability.

To improve safety and reduce congestion, however, it has become increasingly necessary to impose restrictions and constraints upon aircraft operators, tending to diminish the scope of their aircraft autonomy. Some limitations may have been operator-imposed, such as instrument-only flight restrictions, under which operators who are unable to operate safely and efficiently without the aid of instrumentation may voluntarily restrict their operations. Other limitations may have been legislated, for example, through the imposition of air traffic restrictions by designated authorities. Due to increased air traffic, the expansion of both the scope and duration of legislated restrictions is commonly viewed as the only currently viable means of reliably ensuring aircraft separation, preventing airport congestion, maintaining special-use airspace zones, and in general, ensuring flight safety. This solution, however, is inherently undesirable due to its infringement upon aircraft autonomy.

As a result, significant efforts have been directed toward the development of technology that would accommodate increased air traffic and ensure safety without unnecessarily imposing upon aircraft autonomy. One solution has been the development of control systems that enable operators to reliably reach a predetermined waypoint at, or close in time to, a negotiated, predetermined time of arrival. Admittedly, it is an intrusion upon the autonomy of the aircraft operators to be required to commit to reaching specific waypoints at predetermined times. Nevertheless, some concession of autonomy may be tolerated for the sake of maintaining safety. Required time of arrival control systems are able to satisfy the needs to reduce ground and air-based congestion while simultaneously providing aircraft operators with a relatively high degree of aircraft autonomy.

As air traffic increases, and as the desire for aircraft autonomy also increases, the need for such systems to be enhanced with additional time control authority also increases. It is widely accepted.that operators who reliably and accurately meet their time of arrival commitments will likely receive preferential routing treatment and, therefore, will be able to achieve lower operating costs. Such preferential treatment will also likely include more autonomy as well as the assignment of more direct routes or other preferential treatment such as assignment of trajectories, or missions, that benefit from tail winds.

Increasingly, the terminal area is becoming very tightly controlled. Thus the use of required time of arrival controls may not be useful within the terminal area within the near future. Nevertheless, required time of arrival controls may also be used to achieve scheduled border crossings, checkpoints, or to establish the initial spacing of aircraft entering the terminal area.

A variety of systems are currently available for enabling an aircraft to arrive at a predetermined waypoint substantially at a predetermined time, also known as a required time of arrival (RTA). Unfortunately, however, these prior art systems are deficient in many respects. For example, these current systems are limited in their ability to enable an aircraft to reliably reach the waypoint within a tolerable margin of the RTA, such as, for example within about 30 seconds. This 30 second accuracy, however, is too large for reliable use within the terminal area, which demands a tighter tolerance due to the increased traffic within the terminal area. Further, some current systems are limited in their ability to accommodate dynamic atmospheric effects such as wind, temperature, and/or pressure variations. Moreover, prior art systems are typically capable of automatically adjusting the aircraft's speed only while the aircraft is flying the cruise phase of the mission. These limitations makes it difficult, if not impossible, for such prior art systems to enable an aircraft to reliably reach a predetermined waypoint in the terminal area, and often in the descent or approach phases, substantially at the RTA, e.g., preferably within 6 seconds. Also, prior art systems are typically limited to a specific chosen method of adjusting the speed profile, such as modifying the cost index, or such as adding a constant speed change along a trajectory.

For example, U.S. Pat. No. 5,408,413, which is hereby incorporated by reference for background purposes, discloses such a control system but is limited in its effectiveness due to the manner in which it accomplishes speed modulation. This system modulates speed in such a manner as to maintain a constant ground speed change across all of the flight segments. This system is moderately effective for the cruise segment where aircraft speed may be adjusted significantly without the imposition of an aircraft operational limitation. In the climb, descent, and approach phases, however, the ability of such control systems to modulate aircraft speed is much more likely to be inhibited by one or more aircraft operational limitations. Further, whenever a commanded speed modulation would cause an aircraft operational limitation to be exceeded, a non-linearity will result. In other words, the command will not be performed as expected. As a result, such control systems may be ineffective in modulating speed, may become unstable, and if implemented digitally, may fail to reach a converged solution that may be reliably expected to achieve its intended result within the requisite period of time. This system may also produce a speed profile that is not fuel optimal.

As a further example, U.S. Pat. No. 5,121,325, which is also hereby incorporated by reference for background purposes, relies upon an equivalent range approximation to estimate the effects of changing an independent parameter that is related to operating cost, and indirectly affects the speeds in a resulting mission profile and the anticipated time of arrival. Although this system is able to discover a solution quickly, it relies upon an approximated mission profile resulting in a significant compromise in accuracy. Also, this system is ineffective in the descent and approach phases because the flight path and speeds in descent are sensitive to changes in the cost index. For example, the cost index and descent path must remain substantially constant within the descent phase. Also, the descent speeds are more likely, in this system, to be impacted by an aircraft operational limitation because the descent speeds are more sensitive to cost index changes than the cruise speed. Also, the control may be unable to decrease the descent speed if the powerplant is already being operated at idle.

Attempts have been made to provide an active speed control which utilizes sensory feedback during various phases of flight. All such prior attempts, however, have failed for a number of reasons. The most significant obstacle is that the sensitivity of time of arrival to the climb and descent speed is difficult to estimate. Further, accomplishing desired changes to the climb and descent speeds when the aircraft is in these flight phases is problematic. The basic architecture of current flight management systems does not accommodate modifications to the climb and descent speeds when the aircraft is in these phases.

Therefore, it would be desirable to have an RTA control system and method that would enhance flight safety and provide increased aircraft autonomy by extending its capabilities from the cruise phase to climb, descent and approach.

It would also be advantageous to have an RTA control system and method wherein the method of speed adjustment could be chosen arbitrarily while maintaining acceptable control response time.

It would further be advantageous to have an RTA control system and method wherein the method of speed adjustment could be varied during different segments of the mission while maintaining acceptable control response time.

It would further be advantageous to have an RTA control system and method wherein the method of speed adjustment could be chosen in the cruise segment to minimize fuel consumption while maintaining acceptable control response time.

It would further be advantageous to have an RTA control system and method wherein the method of speed adjustment could be chosen in the descent segment to maintain speed adjustment flexibility late in the flight while maintaining acceptable control response time.

It would further be advantageous to have an RTA control system and method wherein the descent path could be planned to be more shallow than a fuel optimal descent, thereby allowing speed adjustments to be made during descent to accurately meet the time constraint.

It would further be advantageous to have an RTA control system and method wherein the system and method could model more subtle effects and non-linearities, such as the encroachment upon aircraft operational limitations, so that the system and method could quickly determine the most appropriate speed adjustment.

It would further be advantageous to have an RTA control system and method wherein the system would take full advantage of the full flight management system predictions system, and not simply the less accurate equivalent range approximation, so that the determined speed adjustment would be more accurate.

It would further be advantageous to have an RTA control system and method wherein the system would consider fuel reserves in determining the earliest achievable estimated time of arrival.

It would further be advantageous to have an RTA control system and method wherein the system would not suggest an earliest estimated time of arrival that would require the aircraft to accelerate to speeds greater that the speed that would cause the level of the fuel remaining at the destination to be below the minimum reserve.

It would further be advantageous to have an RTA control system and method wherein the RTA could be in the descent phase, below speed constraints and speed transitions, and the system would plan the speed profile to retain control authority for the longest possible period to reduce the risk of missing the RTA.

It would further be advantageous to have an RTA control system and method wherein multiple RTA waypoints could be entered, and the system would be able to select a speed profile to meet each RTA.

It would further be advantageous to have an RTA control system and method wherein the system would be flexible in its ability to accommodate RTA specifications in a variety of logical formats.

It would further be advantageous to have an RTA control system and method wherein the system would optimize the speed profile to minimize fuel consumption while meeting the time constraints.

It would further be advantageous to have an RTA control system and method wherein the flight segments that include airspeed decelerations in descent would be predicted with an off-idle throttle, and wherein the guidance system would accurately control the airspeed to match the predicted mission by dynamically changing the speed target that would be sent to the automatic throttle during the deceleration segment.

SUMMARY OF THE INVENTION

The instant invention provides a system for controlling the flight of an aircraft to meet an RTA. The system comprises a speed profile generator that communicates with a trajectory generator to produce a speed profile signal that enables the aircraft to reach a waypoint substantially at a predetermined time. In the system of the instant invention, the speed profile generator receives a nominal speed command signal, a time error signal and a sensitivity signal. Based on these inputs, the speed profile generator produces a speed profile signal. The trajectory generator receives the speed profile signal and a required time of arrival signal. Based on these signals, the trajectory generator produces a time error signal and a sensitivity signal. This sensitivity signal represents the sensitivity of the time error signal to changes in the speed profile signal.

The instant invention also provides a method of controlling the flight of an aircraft. This method comprises the steps of producing a time error signal in response to a required time of arrival signal and a speed profile signal, revising the speed profile signal in response to the time error signal, producing a sensitivity signal in response to the revised speed profile signal, and revising the speed profile signal in response to the sensitivity signal. Through this method, an aircraft is enabled reliably to reach a waypoint substantially at a predetermined time.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE PREFERRED EMBODIMENTS

Figure 1:
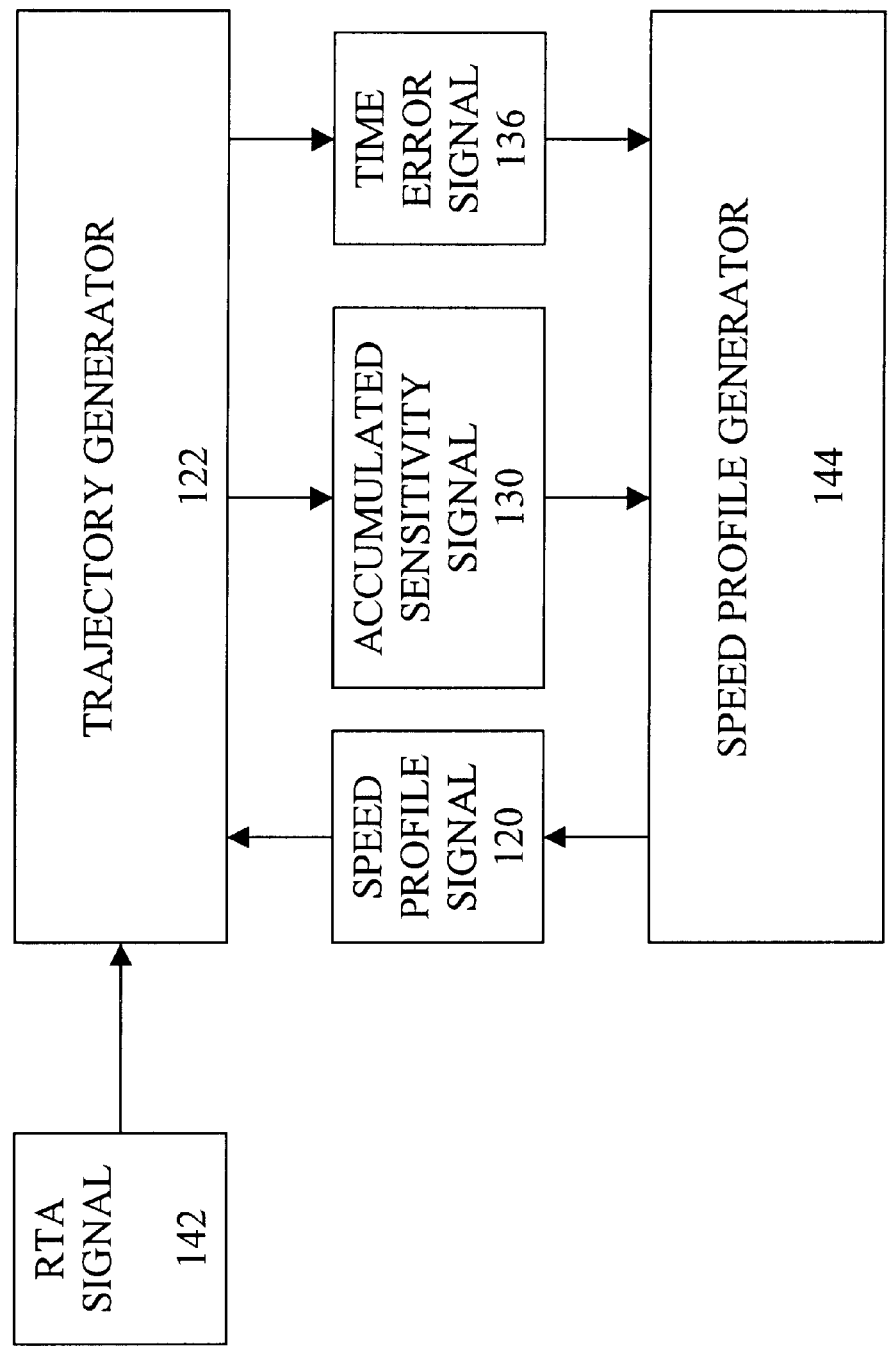
FIG. 1 depicts, in a broad aspect, the flow of information signals as the control performs the functions of the instant invention.

The instant invention provides a generalized system and method for controlling an aircraft to enable the aircraft reliably and accurately to meet an RTA. The instant invention provides an aircraft operator with the ability to effectively accommodate and responsively modulate speed changes in all flight phases of an aircraft mission including climb and descent. Further, the disclosed system and method may be adapted to be effective when applied to differing aircraft control systems that may rely on a wide variety of methods for adjusting speed. In an exemplary embodiment, the instant invention provides a control system and method that produces appropriate acceleration or deceleration commands and apportions the commanded speed changes among the various phases of an aircraft's mission. In the aggregate, these speed changes combine to form a speed profile which describes the speeds at which the aircraft is intended to be operated. Each of these features and capabilities are discussed in more detail below.

In a broad aspect, the instant invention provides a system and method for determining and commanding an appropriate speed profile that is effective in enabling an aircraft reliably to meet an RTA. In another aspect, the instant invention provides a system and method for determining a speed profile, and the speed adjustments that combine to create that speed profile. Several exemplary embodiments for determining the speed adjustment within the speed profile generator are described in more detail below. As provided by the instant invention, the selected method of modulating speed is useful in adjusting the speed profile throughout a mission and in effectively controlling the time of arrival. In yet another aspect, the instant invention provides systems and methods for modulating the speed profile as the mission progresses.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as Fortran, C, C++, Java, XML, COBOL, assembler, PERL, Basic, Matlab or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode, and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical control system.

It will be appreciated, that many applications of the present invention could be formulated. As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. Further, the instant invention contemplates the transmission of signals from, to, and between its elements through a variety of transmission means including, but not limited to, electrical signals, light signals, hydraulic signals, pneumatic signals, electromagnetic signals, and any other equivalent means for transmitting information.

As is conventional, there are several aircraft flight parameter measurements and terms useful in describing the aircraft mission status and the development of trajectories and speed profiles. These parameters as well as terms used herein and conventional notation are defined in the following Glossary.

| | |
|---|---|
| A | Acceleration (or deceleration if negative in sense) |
| CAS | Calibrated airspeed |
| CAS_cmd | Commanded calibrated airspeed |
| CAS_nom | Nominal calibrated airspeed |
| CMD | Command |
| Current_GMT | Current Greenwich mean time |
| DeltaSAP | Change in speed adjustment |
| Dx_Dy | sensitivity of x to changes in y |
| $\delta(X)/\delta(Y)$ | Sensitivity of X to changes in Y |
| $\delta ETA/\delta SAP$ | Sensitivity of ETA to changes in SAP |
| $\delta GndSpd/\delta SAP$ | Sensitivity of ground speed to changes in SAP |
| $\delta^2(X)/\delta(Y)^2$ | Variability in sensitivity of X to changes in Y |
| $\delta^2 ETA/\delta SAP^2$ | Variability in sensitivity of ETA to changes in SAP |
| $\delta^2 GndSpd/\delta SAP^2$ | Variability in sensitivity of ground speed to changes in SAP |
| ECON | Economy profile for speed and altitude to minimize operating cost |
| ETA | Estimated time of arrival |
| ETA(SAP) | Estimated time of arrival based on the speed adjustment |
| GMT | Greenwich mean time |
| GndSpd | Ground speed |
| GS | Ground speed |
| GScmd | Ground speed command |
| GSnom | Nominal ground speed |
| h | altitude |
| M | Mach number |
| L | Distance |
| LegDist | Leg distance |
| LegTime | Leg Time |
| Mach | Mach number |
| Mach_cmd | Commanded mach number |
| Mach_nom | Nominal mach number |
| max | maximum |
| min | minimum |
| RTA | Required time of arrival |
| SAP | Speed adjustment parameter |
| SAPChange | Change in speed adjustment |
| SAPChangeEst | Estimated change in speed adjustment |
| SAPmin | Minimum speed adjustment |
| SAPmax | Maximum speed adjustment |
| SOS | Speed of sound |
| SPD | Speed |
| TAS | True airspeed |
| TASmin | Minimum true airspeed |
| TASmax | Maximum true airspeed |
| TASnom | Nominal true airspeed |
| temp | Temperature |
| T/C or TOC | Top of climb |
| T/D or TOD | Top of descent |
| TimeError | Time error |
| v | Speed |
| Wc | cross wind |
| Wh | head wind |
| WPT | Waypoint |

Figure 2:
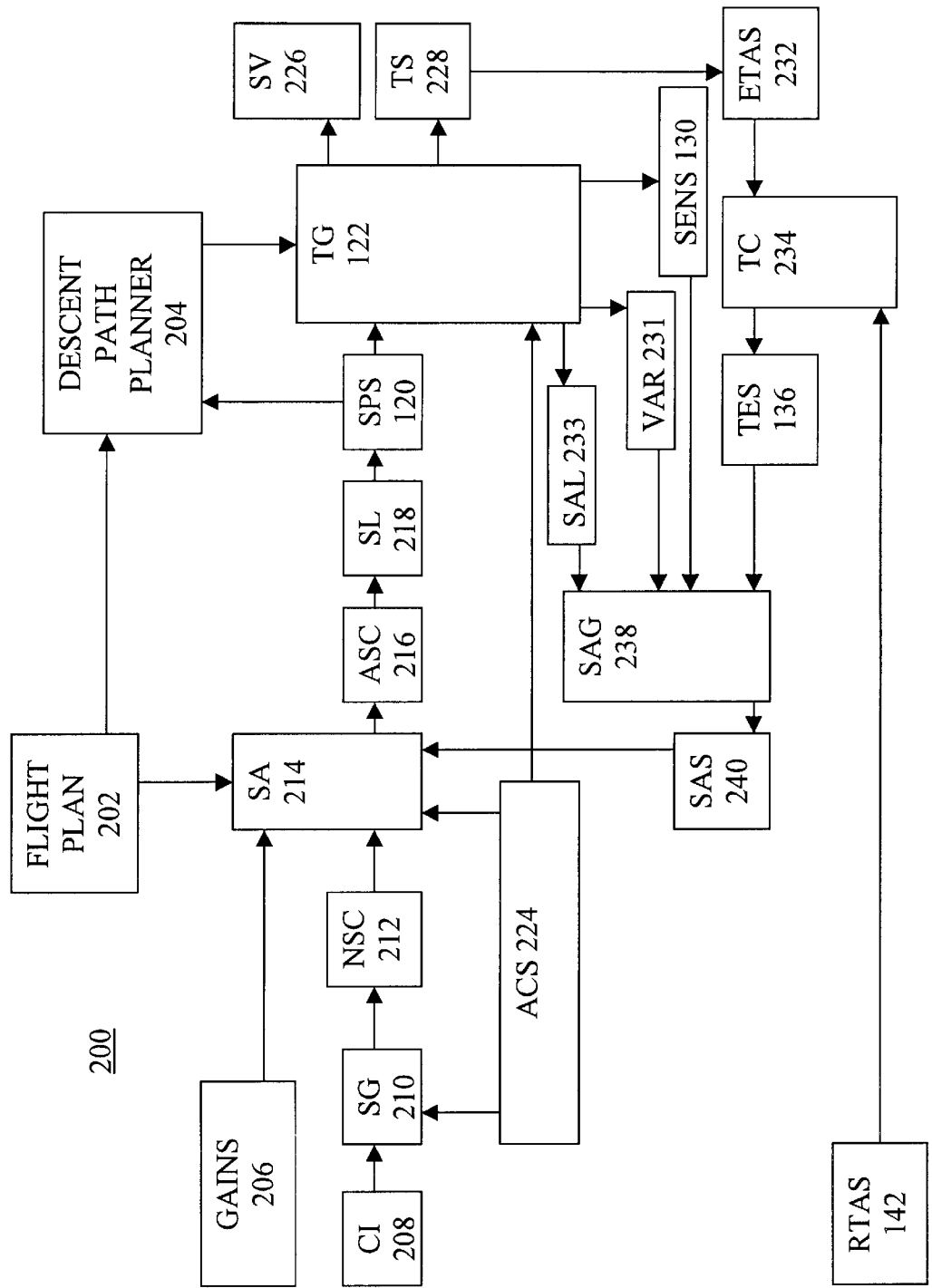
FIG. 2 depicts the flow of information signals as the control performs its functions in an exemplary embodiment of the instant invention, FIG. 3 describes an exemplary method performed by a trajectory generator to produce an accumulated sensitivity, FIG. 4 describes an exemplary method employed by a speed profile generator, or one of its components, a speed adjustment generator, to accommodate a single RTA waypoint, FIG. 5 describes an exemplary method employed by a speed profile generator, or one of its components, a speed adjustment generator, to accommodate multiple RTA waypoints, and FIG. 6 describes an exemplary method of controlling the flight of an aircraft to cause the aircraft to reach a waypoint substantially at a predetermined time.

FIG. 1 depicts, from a high level, an exemplary flow of information signals as the control performs the function of controlling the performance of an aircraft mission to enable an aircraft to meet an RTA. In this broad aspect, a speed profile generator 144 is in communication with a trajectory generator 122. The trajectory generator 122 receives an RTA signal 142 and an initial speed profile signal 120. In response to the RTA signal 142 and the initial speed profile signal 120, the trajectory generator 122 produces a time error signal 136 and an initial accumulated sensitivity signal 130. As one skilled in the art readily appreciates, the trajectory generator 122 and the speed profile generator 144 may be implemented in a variety of embodiments, for example, as distributed elements. For example, the speed profile generator 144 may be implemented as depicted in FIG. 2, as a speed adjustment generator 238 in communication with a speed adjuster 214.

It is worth noting that this control may be configured to accommodate performance prediction functionality typical of conventional flight management systems. In response to the accumulated sensitivity signal 130 and the time error signal 136, the speed profile generator revises the speed profile signal 120. In response to the revised speed profile signal 120 and the RTA signal 142, the trajectory generator 122 revises the time error signal 136 and the accumulated sensitivity signal 130. This iterative process continues until the time error signal 136 represents a sufficiently small time error 136, such as being within a predetermined tolerance level, and the speed profile is then communicated to the appropriate aircraft control for implementation. Put another way, the speed adjustment and the resulting speed profile is determined through iteration, wherein each pass of performance predictions refines the speed adjustment and thus the speed profile until the estimated time of arrival matches the RTA.

Thus, the speed profile contains sufficient information for the trajectory generator to predict the motion of the aircraft over the complete flight plan. The speed profile may explicitly include climb, cruise, and descent speeds. Alternatively, the speed profile may comprise a parameter, or a set of parameters, that includes sufficient information, when combined with a predefined set of rules, to uniquely define the speeds to be traversed by the aircraft. In a preferred embodiment, the speed profile is defined in accordance with a set of reference optimum speeds, a speed adjustment or set of adjustments that define the incremental adjustments to be applied relative to the optimum speeds, and speed adjustment gains that effectively apportion the speed adjustments among the mission phases. Additionally, the speed profile may contain information indicative of the corresponding reference atmospheric conditions and desired flight plan.

The accumulated sensitivity signal represents an estimate of changes in the time of arrival resulting from changes to the speed profile relevant to a particular speed profile. Several exemplary methods for determining an accumulated sensitivity are described below.

FIG. 2 depicts, in greater detail, an exemplary system for controlling an aircraft to meet a required time of arrival. In this exemplary system, a desired flight plan signal 202, nominal speed command signals 212, an atmospheric condition signal 224, speed adjustment gain signals 206, and a speed adjustment signal 240 are communicated to the speed adjuster 214 of the control system 200. The nominal speed command signals 212 are produced by speed generators 210, which may include conventional climb, cruise, and descent speed generators. The speed generators 210 determine nominal speed command signals based on the atmospheric condition signal 224 and, in this exemplary embodiment, a cost index signal 208. The speed adjustment gain signals 206 affect how the speed adjustments are apportioned among flight phases such as climb, cruise, and descent. The speed adjuster 214 adjusts the nominal speed command signals 212 in response to the flight plan signal 202, the nominal speed command signals 212, the various speed adjustment gain signals 206, and the speed adjustment signal 240 to produce an adjusted speed command 216, which may be limited by a speed limiter 218. After ensuring that the adjusted speed command 216 does not violate any limits or constraints, the speed limiter 218 produces a speed profile signal 120 that is communicated to a descent path planner 204. In addition to receiving the speed profile signal 120, the descent path planner 204 also receives the flight plan signal 202 and plans the descent path using a predicted RTA speed for descent that is configured to ensure an off-idle throttle setting. Finally, the descent path planner 204 sends a responsive signal to the trajectory generator 122 for combination with the speed profile signal 120 to amend the speed profile signal 120.

With further reference to FIG. 2, the trajectory generator 122 receives the speed profile signal 120, as optionally amended by the descent path planner 204, in addition to the atmospheric condition signal 224 to produce various status variable signals 226 relating to position, speed, fuel remaining and fuel consumption. The trajectory generator 122 determines the sum of the sensitivities of the estimated time of arrival to changes in the speed adjustment and produces sensitivity signal 130, which may include an accumulated sensitivity signal. The trajectory generator 122 also produces speed adjustment limitation signals 233 and variability signals 231. The sensitivity signals 130, speed adjustment limitation signals 233 and variability signals 231 are communicated to a speed adjustment generator 238. In addition, various time signals 228, such as an estimated time of arrival signal 232, are communicated to a time comparator 234. In one embodiment, the trajectory generator 122 may include an integrated time comparator 234.

The time comparator 234 receives the estimated time of arrival signal 232 as well as an RTA signal 142 to produce an accumulated time error signal 136 that is communicated to the speed adjustment generator 238. Finally, the speed adjustment generator 238 produces the speed adjustment signal 240, which is communicated to the speed adjuster 214. The speed adjuster 214 also determines the sensitivity of the adjusted speed command signals 216 to changes in the speed adjustment signal 240.

In an exemplary embodiment, the system and method of the instant invention comprises the step of determining the speed adjustment, and thus the speed profile, in a series of iterative passes. This iterative refinement enhances the reliability and accuracy of the result. In accordance with this embodiment, the determination of the speed adjustment and the corresponding speed profile is accomplished by approximating an estimated time of arrival and determining the necessary speed adjustment increment in accordance with the following exemplary relationship:

$$ETA(SAP + SAPChange) \cong ETA(SAP) + \frac{\partial ETA}{\partial SAP} SAPChange = RTA.$$

Based on the above-described relationship, one with ordinary skill in the art appreciates that the speed adjustment increment may also be described in accordance with the following exemplary approximate relationship:

$$SAPChange = \frac{-TimeError}{\frac{\partial ETA}{\partial SAP}} \text{ where } TimeError = ETA - RTA.$$

This speed adjustment increment may then be added to the speed adjustment for the each successive pass of performance predictions.

In general, in a simplified form, a flight management system may determine an estimated time of arrival in accordance with the following exemplary approximate relationship, which is based upon the summation of the trajectory segment distance divided by the groundspeed and the current time:

$$ETA = \sum_{WPTS} \frac{LegDist}{GndSpd} + \text{Current\_GMT}.$$

As a practical matter, the trajectory traversed by an aircraft in the performance of the various phases of its mission may be divided into segments, each segment representing the path between waypoints, or a portion of the path between waypoints. These trajectory segments each contribute to the summations described herein. The above-described summation is applied across the appropriate trajectory segments as noted by the term WPTS.

Therefore, the sensitivity to a speed adjustment change, and the corresponding speed profile change, may be estimated in accordance with the following exemplary relationship:

$$\frac{\partial ETA}{\partial SAP} = \sum_{wpts} \frac{-LegDist}{GndSpd^2} \frac{\partial GndSpd}{\partial SAP}.$$

which may also be described in accordance to the following exemplary relationship:

$$\frac{\partial ETA}{\partial SAP} = \sum_{WPTS} -\frac{LegTime}{GndSpd} \frac{\partial GndSpd}{\partial SAP}.$$

As mentioned above, the method for determining the sensitivity of groundspeed to changes in speed adjustment depends upon the choice of the speed adjustment method. Several exemplary speed modulation methods are described in greater detail below.

Since a commanded aircraft speed may be subject to an aircraft operational limitation, the sensitivity of groundspeed to changes in speed adjustment, and corresponding changes in speed profile, may differ depending upon whether the acceleration is positive or negative, or in other words, whether an acceleration or a deceleration is required. As a result, each sensitivity must be determined in accordance with two methods, one method applying to accelerations and another method applying to decelerations. For example, the sensitivity associated with an acceleration may be insubstantial for the portions of the trajectory where the speed profile is limited by an aircraft operational limitation associated with a maximum speed. In such cases, the applicable sensitivity to be used depends upon whether the commanded speed adjustment turns out to be an acceleration or a deceleration. In other situations, the speed may not be adjustable for a given flight segment due to the imposition of another aircraft operational limitation. Accordingly, the sensitivity may be insubstantial for both cases, accelerations and decelerations.

In this exemplary embodiment, the relationships may be conveniently described in accordance with the following exemplary relationships and nomenclature:

$$\text{deta\_dsap\_up} =$$

-continued $$\begin{cases} \frac{\partial ETA}{\partial SAp} & \text{if not on upper speed limit or speed constraint} \\ 0 & \text{if on upper speed limit or speed constraint} \end{cases}$$

$$\text{deta\_dsap\_dn} = \begin{cases} \frac{\partial ETA}{\partial SAP} & \text{if not on lower speed limit or speed constraint} \\ 0 & \text{if on lower speed limit or speed constraint} \end{cases}$$

This exemplary approximate method provides reliable results whenever a linear relationship is properly assumed, or whenever any unexpected or unaccounted nonlinear effects contribute only desirable or stabilizing effects.

In addition to the above-described approximate system and method, the instant invention alternatively provides a refined system and method for determining the speed adjustment and the corresponding speed profile. It has been discovered that where large speed adjustments are determined and commanded in accordance with the instant invention, nonlinear effects, such as those that may be introduced by the interference of an aircraft operational limitation, may cause the commanded speed produced by the approximate methods described above to unexpectedly fail to achieve the RTA. For example, where a commanded deceleration cannot be achieved because, for example, the aircraft is already flying at its minimum speed or descending with its engines operating at minimum thrust or at idle, the aircraft may likely arrive at the waypoint prior to the estimated time of arrival. Alternatively, where a commanded acceleration cannot be achieved because, for example, the aircraft is flying at its maximum speed or is climbing with its engines operating at a maximum throttle setting corresponding to a maximum level of thrust output, the aircraft may likely arrive at the waypoint later than the estimated time of arrival. Also, depending upon the selection of the speed adjustment method, the behavior away from the aircraft operational limitations may also be nonlinear. Therefore, to account for nonlinear effects such as those described above, the instant invention provides an alternative refined system and method as described below. This refined system and method may be used as an alternative to the approximate system and method described above.

First, in accordance with this exemplary refined system and method, the estimated time of arrival may be described in accordance with the following exemplary expression:

$$ETA(SAP + SAPChange) \cong$$
$$ETA(SAP) + \frac{\partial ETA}{\partial SAP}SAPChange + \frac{1}{2}\frac{\partial^2 ETA}{\partial SAP^2}SAPChange^2.$$

Further, this exemplary representation of estimated time of arrival may be related to the RTA, and the relationship may alternatively be described in accordance with the following exemplary relationship:

$$\frac{1}{2}\frac{\partial^2 ETA}{\partial SAP^2}SAPChange^2 + \frac{\partial ETA}{\partial SAP}SAPChange + TimeError = 0.$$

These exemplary relationships for speed adjustment increment may be used to determine two values of speed adjustment increment, one being positive and the other negative. It has been discovered that, in accordance with this embodiment, the negative solution for speed adjustment increment reliably produces appropriate results while the positive solution sometimes produces inappropriate results.

Thus, the instant invention prefers to rely upon and implement the negative solution.

In accordance with this exemplary refined system and method, the variability of the sensitivity may be estimated in accordance with the following exemplary relationship:

$$\frac{\partial^2 ETA}{\partial SAP^2} = \sum_{wpts}\left[\frac{2LegDist}{GndSpd^3}\left(\frac{\partial GndSpd}{\partial SAP}\right)^2 - \frac{LegDist}{GndSpd^2}\frac{\partial^2 GndSpd}{\partial SAP^2}\right].$$

In some situations, difficulties arise in implementing the above-described refined relationships. These difficulties are often associated with non-linearities, such as those caused by aircraft operational limits. In such situations, the instant invention may provide for the use of anticipatory sensitivities, which are based on the sensitivity of the estimated time of arrival to changes in speed adjustment for anticipated speed profiles slightly faster than, and slightly slower than, the current speed adjustment. These anticipatory sensitivities may be generated based on the variability for each trajectory segment in accordance with the following exemplary relationships:

$$\left(\frac{\partial ETA}{\partial SAP}\right)\bigg|_{plus} = \frac{\partial ETA}{\partial SAP} + \frac{\partial^2 ETA}{\partial SAP^2}DeltaSAP, \text{ and}$$

$$\frac{\partial ETA}{\partial SAP}\bigg|_{minus} = \frac{\partial ETA}{\partial SAP} - \frac{\partial^2 ETA}{\partial SAP^2}DeltaSAP.$$

Next, these sensitivities may be evaluated for application to an acceleration or a deceleration by determining whether the incremented speed adjustments are operationally limited. If the speeds are operationally limited, the sensitivity will be insubstantial, indicating that the interference of an aircraft operational limitation will substantially prevent effective speed modulation. In these situations, the exemplary relationships described immediately below are effective in enabling the instant invention to anticipate interferences associated with the imposition of one or more aircraft operational limitations.

$$deta\_dsap\_up\_at\_sap\_plus = \begin{cases} \left(\frac{\partial ETA}{\partial SAP}\right)\bigg|_{plus} & \text{if not on upper speed limit at } SAP + DeltaSAP \\ 0 & \text{if on upper speed limit at } SAP + DeltaSAP \end{cases}$$

$$deta\_dsap\_up\_at\_sap\_minus = \begin{cases} \left(\frac{\partial ETA}{\partial SAP}\right)\bigg|_{minus} & \text{if not on upper speed limit at } SAP - DeltaSAP \\ 0 & \text{if on upper speed limit at } SAP - DeltaSAP \end{cases}$$

$$deta\_dsap\_dn\_at\_sap\_plus = \begin{cases} \left(\frac{\partial ETA}{\partial SAP}\right)\bigg|_{plus} & \text{if not on lower speed limit at } SAP + DeltaSAP \\ 0 & \text{if on lower speed limit at } SAP + DeltaSAP \end{cases}$$

$$deta\_dsap\_dn\_at\_sap\_minus = \begin{cases} \left(\frac{\partial ETA}{\partial SAP}\right)\bigg|_{minus} & \text{if not on lower speed limit at } SAP - DeltaSAP \\ 0 & \text{if on lower speed limit at } SAP - DeltaSAP \end{cases}$$

Thus, these anticipatory sensitivities may be accumulated over the flight plan and used to determine the variability of the sensitivity for the entire flight plan.

To estimate the variability of a sensitivity, the difference between the sensitivity at the speed adjustment, and the anticipatory sensitivity at the incremented speed adjustment, may then be determined and normalized in accordance with the magnitude of the speed adjustment increment. If no aircraft operational limitation is effective, the variability of the sensitivity may be obtained in accordance with this exemplary analytical relationship. Otherwise, the effects of the aircraft operational limitations may be included in the resulting average value. If, starting from a positive speed adjustment, the appropriate acceleration sensitivity is used, and if an acceleration is required, then the appropriate positive anticipatory sensitivity should also be used.

In this exemplary embodiment, where an acceleration is commanded from an already positive speed adjustment, the variability of the sensitivity of the estimated time of arrival to changes in speed adjustment may be described in accordance with the following exemplary relationship:

$$\frac{\partial^2 ETA}{\partial SAP^2} \cong \frac{deta\_dsap\_up\_at\_sap\_plus - deta\_dsap\_up}{DeltaSAP}.$$

It has been discovered, however, that the above exemplary relationship can be problematic, causing overshoots when the accuracy of the approximation of the variability of the sensitivity is insufficient. Therefore, as an alternative to the method described immediately above, a two-step method, used in conjunction with a variety of reasonableness checks, may be implemented to improve reliability. In this embodiment, the speed adjustment increment may be estimated using the approximate method and qualitative reasonableness checks may be performed to test the result. Then, a modified sensitivity may be determined by estimating the sensitivity at the midpoint between the current speed adjustment and the estimated speed adjustment using the appropriate estimate of the variability of the sensitivity. Finally, the approximate method described above may be reapplied using this modified sensitivity. This alternative method may be further described with reference to the following method steps:

(a) First, estimating the speed adjustment increment in accordance with the following exemplary relationship:

$$SAPChangeEst = \frac{-TimeError}{\frac{\partial ETA}{\partial SAP}};$$

(b) Second, comparing the estimated speed adjustment increment to speed adjustment limits and limiting the change if appropriate;

(c) Third, estimating the sensitivity at the midpoint using the variability of the sensitivity in accordance with the following exemplary relationship:

$$\frac{\partial ETA}{\partial SAP} = \frac{\partial ETA}{\partial SAP} + \frac{1}{2}\frac{\partial^2 ETA}{\partial SAP^2}SAPChangeEst,$$

(d) Fourth, limiting this sensitivity with minimum and maximum values and other reasonableness checks;

(e) Fifth, determining the speed adjustment increment in accordance with the following exemplary relationship:

$$SAPChange = \frac{-TimeError}{\frac{\partial ETA}{\partial SAP}}; \text{ and}$$

(f) Sixth, comparing the resulting speed adjustment increment to speed adjustment limits and limiting the change if appropriate.

Figure 3:
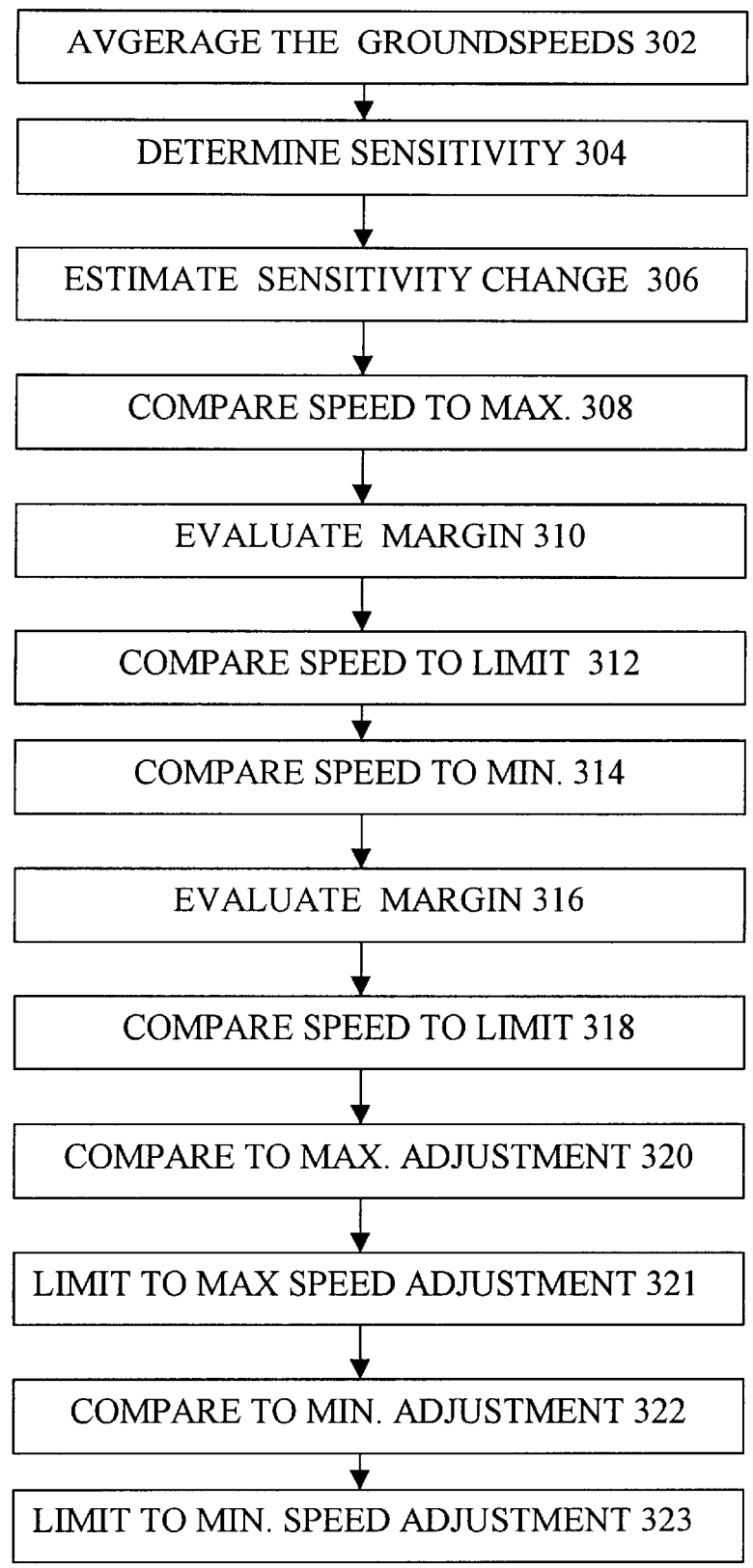

FIG. 3 describes, in greater detail, an exemplary method performed by a trajectory generator 122 to produce a speed adjustment sensitivity. In this embodiment, six sensitivities of estimated time of arrival to changes in the speed adjustment signal, as well as minimum and maximum speed adjustments, may be determined.

In this embodiment, the trajectory generator averages the ground speeds from each segment of the mission (step 302). Then, the sensitivity of the estimated time of arrival to changes in the speed adjustment for each mission phase is determined (step 304). Next, the change in sensitivity of the estimated time of arrival to changes in the speed adjustment is estimated (step 306). This is accomplished using small changes in the speed adjustment to determine the variability of the sensitivities. Next, the speed is compared to a maximum speed that represents an aircraft operational limitation (step 308). If the limitation is not expected to interfere, the extent of the margin between the current speed and any relevant aircraft operational limitation is evaluated (step 310). If there is sufficient margin, the current speed is again compared to the aircraft operational limitation to determine whether the current speed in fact exceeds the limitation (step 312). If the current speed does not exceed an aircraft operational limitation, then the current speed is compared to a minimum aircraft operational limitation (step 314). If the limitation is not in effect, then the extent of the margin between the limit and the current speed is determined (step 316). If there is sufficient margin between the minimum speed and the current speed, then the current speed is compared to a minimum speed aircraft operational limitation (step 318). If the current speed is less than the minimum speed, then the current maximum speed adjustment will be compared to a global maximum speed adjustment (step 320). If the current speed adjustment exceeds the global maximum speed adjustment, then the global maximum speed adjustment is set equal to the current maximum speed adjustment (step 321). Finally, then, the current minimum speed adjustment is compared to a global minimum speed adjustment (step 322). If the current minimum speed adjustment is less that the global minimum speed adjustment, then the global minimum speed adjustment is set equal to the current minimum speed adjustment (step 323).

The following exemplary logical relationships apply to both the approximate and the refined speed adjustment systems and methods described above. The use of these approximate and refined speed adjustment systems and methods may be accomplished as described below.

It should be noted that the presence and frequency of nonlinearities of estimated time of arrival as a function of speed adjustment depend upon the choice of speed adjustment method. It has been discovered that for the method for determining the speed adjustment based upon a constant airspeed, and for the method for determining the speed adjustment based upon a constant groundspeed, the approximate systems and methods tend to produce more reliable results whenever there is a likelihood of a nonlinearity due to the imposition of an aircraft operational limitation. Upon receiving an initial RTA, the system of the instant invention, any nonlinear effects may cause the approximate estimate of speed adjustment to undershoot the required value. Undershooting is not desirable, but is also not catastrophic. In sum, the approximate method may reliably produce acceptable results in the vicinity of an aircraft operational limitation. It has been discovered, however, that accounting for such nonlinear effects, although potentially enhancing accuracy, in fact may cause an unreasonable risk of overshooting the RTA.

It has also been discovered that, for the method for determining the speed adjustment based upon a constant airspeed, and for the method for determining the speed adjustment based upon a constant groundspeed, when a new RTA is entered that is closer to the nominal speed profile than a former RTA, or in situations where the approximate system and method actually causes an overshoot of the RTA, then the nonlinear effects caused by the imposition of an aircraft operational limitation may cause the approximate speed adjustment estimate to overshoot the RTA. Thus, the refined speed adjustment system and method is preferred whenever the aircraft departs substantially from an aircraft operational limitation.

It has also been discovered that the method for determining speed adjustment based upon a constant groundspeed often behaves nonlinearly, even when not approaching aircraft operational limitations, such as when the atmospheric conditions are highly variable over the flight plan. Thus, the refined method is preferred for more reliable convergence, although special care may be required to prevent the refined method from overshooting the RTA.

As discussed above, the instant invention is generalized such that it permits the commanded speed changes to be represented by a generalized parameter that may be determined in accordance with several conventions or methods. Accordingly, the instant invention provides a variety of methods for determining the speed adjustment. Applicable methods for applying speed adjustments in accordance with various speed adjustment methods are described below. The system and method of the instant invention may be applied to any speed adjustment method so long as the chosen speed adjustment method is based on a single mission-related physical parameter, and so long as the sensitivity of the adjusted speed command to changes in the parameter may be determined. Exemplary methods include a groundspeed method, a constant true airspeed method, a percentage airspeed method, and a cost index method. Each of these exemplary methods is described in detail below.

In a preferred embodiment, the percentage airspeed method may be used to accomplish speed adjustments in climb and descent. This method reliably produces constant Mach number (M) and calibrated air speeds (CAS) and permits changes to the descent speeds that are lower in magnitude than those applied to the cruise speeds, permitting some maneuvering room to be reserved in descent. Contrariwise, common prior art cost index methods unnecessarily consume descent speed adjustment capability.

Additional alternative methods for adjusting speed, and corresponding methods for determining the parameter values required by the speed adjustment system and method, are described below. In each case, however, it is necessary to determine the sensitivity of the resulting groundspeed to changes in the speed adjustment and the maximum and minimum speed adjustment as a function of the maximum and minimum groundspeed or airspeed.

In an exemplary embodiment, a groundspeed method may be used to achieve the RTA. In this method, a constant percentage may be applied to scale the groundspeeds equally at all points in the flight plan. The nominal groundspeed may be determined from the scheduled airspeed command and the predicted wind speed. The groundspeed may then be scaled by the speed adjustment in accordance with the following exemplary relationship:

$$GScmd = \frac{GSnom}{1 - SAP}.$$

The airspeed command may then be described in terms of the groundspeed and the wind speed. This method may reliably produce an accurate speed change so long as the speed is not near an aircraft operational limitation. In addition, this method is quick in producing a converged speed adjustment solution. Unfortunately, however, the resulting solution may not be the most economical solution in terms of fuel consumption. This situation is the result of the fact that speeds in the presence of a headwind may be increased less than speeds in the presence of a tailwind. As a result, the commanded airspeed may vary depending upon the wind speed, even if the nominal profile is a constant, though not insubstantial, airspeed.

In accordance with this exemplary method, the sensitivity to changes in speed adjustment, and the variability of the sensitivity to changes in speed adjustment, may be determined in accordance with the following exemplary relationships:

$$\frac{\partial GndSpd}{\partial SAP} = \frac{GSnom}{(1-SAP)^2}, \text{ and}$$

$$\frac{\partial^2 GndSpd}{\partial SAP^2} = \frac{2 GSnom}{(1-SAP)^3}.$$

Further, the minimum and maximum speed adjustment may be determined from the minimum and maximum groundspeeds in accordance with the following exemplary relationships:

$$SAPmin = 1 - \frac{GSnom}{GSmin}, \text{ and}$$

$$SAPmax = 1 - \frac{GSnom}{GSmax}.$$

It has been discovered that, for this particular choice of speed adjustment method, a much simpler description of the relationships in this speed adjustment system and method is possible. For example, substituting the exemplary groundspeed relationship into the exemplary estimated time of arrival relationship, the estimated time of arrival may be determined in accordance with the following exemplary relationship:

$$ETA = \sum_{wpts} \frac{(1-SAP)*LegDist}{GSnom} + \text{Current\_GMT}.$$

In addition, the sensitivity of estimated time of arrival to changes in speed adjustment may be determined in accordance with the following exemplary relationship:

$$\frac{\partial ETA}{\partial SAP} = \sum_{wpts} \frac{-LegDist}{GSnom} = \sum_{wpts} -LegTime.$$

And, finally, the speed adjustment increment may be determined in accordance with the following exemplary relationship:

$$SAPChange = \frac{-TimeError}{\sum_{wpts} -LegTime} = \frac{TimeError}{\sum_{wpts} LegTime}.$$

Alternatively, the instant invention provides a Constant True Airspeed Method for achieving an RTA. This method adds a constant TAS to the speed at each point in the flight plan. The nominal airspeed is then determined from the speed profile and the resulting groundspeed is found by applying the wind effects. For the sake of simplicity, the effects of crosswinds may be ignored. Alternatively, they can be included, as shown in the exemplary percentage airspeed relationship described below.

$$GS = TASnom - Wh + SAP$$

where Wh is the head wind

It has been discovered that this method may more closely approximate the fuel optimal RTA mission and may reliably produce an airspeed command that is less dependent upon the wind speed.

In this exemplary embodiment, the sensitivity of groundspeed to changes in the speed adjustment, and the variability of the sensitivity of groundspeed to changes in the speed adjustment, may be described in accordance with the following exemplary relationships:

$$\frac{\partial GndSpd}{\partial SAP} = 1, \text{ and}$$

$$\frac{\partial^2 GndSpd}{\partial SAP^2} = 0.$$

In addition, the minimum and maximum speed adjustment may be determined from the minimum and maximum airspeed in accordance with the following exemplary relationships:

$$SAPmin = TASmin - TASnom,$$

and $$SAPmax = TASmax - TASnom.$$

In accordance with this method, it is preferable to ensure that the groundspeed is protected from going negative.

In yet another exemplary embodiment, the speed adjustment may be determined in accordance with a Percentage Airspeed method. This method scales the airspeed command, expressed in terms of M or CAS, in accordance with a constant percentage at each point in the flight plan. The instant invention provides two alternative formulations for the percentage airspeed method: (1+the speed adjustment) in the numerator, or (1−the speed adjustment) in the denominator. In a preferred embodiment, the numerator approach is used for simplicity, in accordance with the following exemplary relationships:

$$\text{Mach\_cmd} = \text{Mach\_nom} * (1 + SAP),$$

and $$\text{CAS\_cmd} = \text{CAS\_nom} * (1 + SAP).$$

It has been discovered that this method produces a constant M or CAS target for each flight segment, including climb and descent, which is appealing to pilots. If the nominal speed target is not constant, such as an LRC or ECON speed, this method is reasonably fuel efficient, since the shape of the speed profile is preserved.

In accordance with this method, the groundspeed may be determined from the airspeed and the windspeed in accordance with the following exemplary relationships:

$$GndSpd = \sqrt{TAS^2 - Wc^2 - Wh},$$

$$TAS = SOS * Mach,$$

and $$TAS = f(CAS, h, temp).$$

The sensitivity of groundspeed may then be determined as the product of the three sensitivities as described immediately below. First, if the speed mode is M, then the sensitivity may be determined in accordance with the following exemplary relationship:

$$\frac{\partial GndSpd}{\partial SAP} = \frac{\partial GndSpd}{\partial TAS} \frac{\partial TAS}{\partial M} \frac{\partial M}{\partial SAP}.$$

Second, if the speed mode is CAS, then the sensitivity may be determined in accordance with the following exemplary relationship:

$$\frac{\partial GndSpd}{\partial SAP} = \frac{\partial GndSpd}{\partial TAS} = \frac{\partial TAS}{\partial CAS} = \frac{\partial CAS}{\partial SAP}.$$

Then the three sensitivities may be determined separately in accordance with the following exemplary relationships for the numerator formulation:

$$\frac{\partial GndSpd}{\partial TAS} = \frac{TAS}{\sqrt{TAS^2 - Wc^2}} \cong 1,$$

$$\frac{\partial TAS}{\partial M} = speed\ of\ sound,$$

$$\frac{\partial TAS}{\partial CAS} = \frac{TAS}{CAS},$$

$$\frac{\partial M}{\partial SAP} = Mach\_nom,\ and$$

$$\frac{\partial CAS}{\partial SAP} = Cas\_nom.$$

The variability of the sensitivity of groundspeed to changes in the speed adjustment, then, may be determined in accordance with the following exemplary relationship:

$$\frac{\partial 2GndSpd}{\partial SAP^2} = 0,$$

Finally, the minimum and maximum speed adjustment may be determined from the minimum and maximum airspeeds in accordance with the following exemplary relationships:

$$SAPmin = \frac{TASmin}{TAS} - 1,\ and$$

$$SAPmax = \frac{TASmax}{TAS} - 1,$$

where the TASmin and TASmax represent the true airspeeds associated with the minimum and maximum airspeed limits associated with aircraft operational limitations; and TAS is the TAS associated with an insignificant speed adjustment.

In addition, in an exemplary embodiment, the instant invention provides means for preventing the commanding of a negative groundspeed, which may exceed an aircraft operational limitation. In one such exemplary embodiment, a minimum groundspeed value is converted to a minimum TAS, which is compared against the determined minimum speed adjustment. Then, TASmin, which is associated with the minimum airspeed, and the larger TASmin, which may be determined in accordance with the following exemplary relationship:

$$TASmin = \sqrt{(GndSpd\ min + Wh)^2 + Wc^2},$$

are used.

The percentage airspeed denominator formulation, then, may be determined in accordance with the following exemplary relationships:

$$Mn\_cmd = Mn\_nom/(1 - SAP),$$

$$\frac{\partial M}{\partial SAP} = \frac{Mach\_nom}{(1 - SAP)^2},$$

$$\frac{\partial^2 GndSpd}{\partial SAP^2} = \frac{\partial GndSpd}{\partial TAS} * \frac{\partial TAS}{\partial M} * \frac{\partial^2 M}{\partial SAP^2},\ and$$

$$\frac{\partial^2 M}{\partial SAP^2} = \frac{Mach\_nom}{(1 - SAP)^3}.$$

A calibrated airspeed method, or other method of defining speed, may similarly be accommodated through substitution, in the above described exemplary relationships, of CAS or such other speed parameter as may be appropriate, for M. The minimum speed adjustment and the maximum speed adjustment may be determined in accordance with the following exemplary relationships:

$$SAPmin = 1 - \frac{TAS}{TASmin},\ and$$

$$SAPmax = 1 - \frac{TAS}{TASmax}.$$

In yet another exemplary embodiment, a Cost Index Method may be used for determining the speed adjustment. This method has been discovered to be particularly useful in conjunction with flight management systems that have an ECON mode based upon a cost index, such that the cost index is an effective parameter to choose for speed adjustment. This method is appropriate whenever it is important for the speed profile to be fuel optimal, or when convenience is desired in changing the entire speed profile for the flight management systems. In many cases, this method is desirable because a cost index is already in the system. Unfortunately, however, the effects of cost index on the speed profile and estimated time of arrival may be nonlinear.

Figure 4:
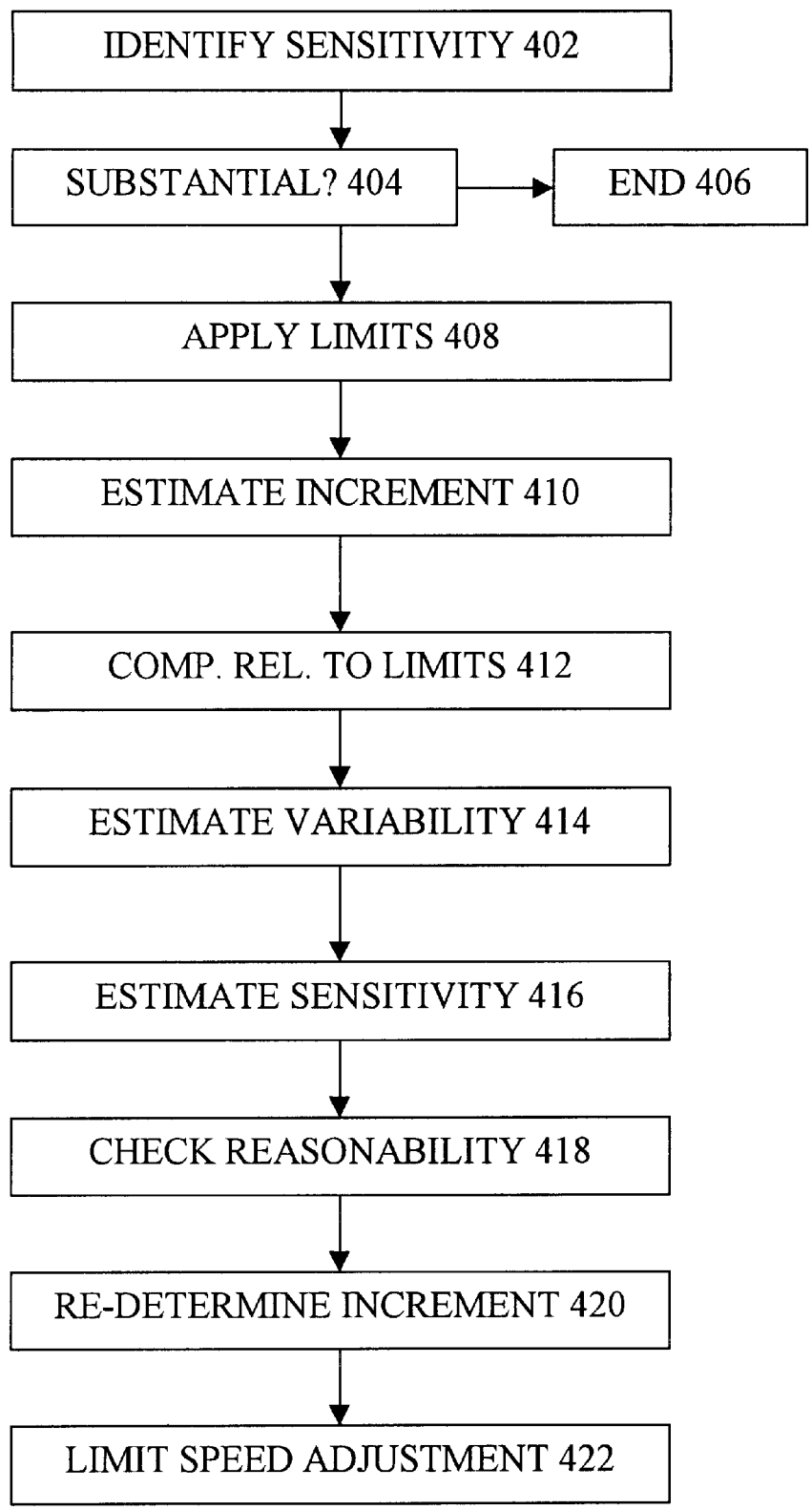

FIG. 4 describes an exemplary method employed by a speed adjustment generator 238 to accommodate a single RTA waypoint. As depicted in FIG. 4, the first step in determining the speed adjustment is to determine which of the six sensitivities are required for the current situation (step 402). This depends first upon whether the aircraft has accelerated or decelerated, and second, upon whether an acceleration or deceleration is required to satisfy the needs of the control. Next, if the sensitivities are determined to be insubstantial (step 404), then the aircraft operational speed limits are in effect, and the iteration is terminated (step 406). Similarly, if very little time is left to adjust speed, then the iteration is terminated (step 406). To improve the stability of the system and method, the sensitivity is prevented from being too insubstantial.

If, however, there is sufficient time to proceed, and the sensitivities are not insubstantial, then it is determined whether the sensitivities are smaller than a predetermined value, in which case they are set to be equal to the limit (step 408). Next, the speed adjustment increment is estimated based on the sensitivity (step 410). Then, the speed adjustment is compared to the minimum and maximum limits, and the speed adjustment increment is limited accordingly (step 412). Then, the variability of the sensitivity of the estimated time of arrival to changes in the speed adjustment is estimated (step 414). Next, the sensitivity at the mid-point of the change is estimated based on the variability of the sensitivity (step 416). Reasonableness checks are then performed on the sensitivity to ensure the stability of the system (step 418). Then, the speed adjustment increment is re-determined based on a refined sensitivity (step 420). Finally, the speed adjustment is compared against the minimum and maximum limits, and if it exceeds those limits, it is re-set to the corresponding limit (step 422). Exemplary relationships useful in implementing these steps and in determining the speed adjustment are described in more detail in this detailed description.

It has been discovered that controlling to an RTA in the descent phase requires several issues be addressed. First, to meet an RTA constraint in descent accurately, while remaining on the vertical flight path, the throttle and/or speedbrakes must be capable of manipulation by the control. Since the speedbrakes may not always be susceptible to such automatic control, however, additional margin, relative to any relevant aircraft operational limitations, must be acquired for control of the throttle in descent. It has been discovered that this necessary additional margin may be acquired by scheduling a descent path with a less steep angle of descent. Choosing such a more shallow, or less steep, descent path tends to enable the throttles to nominally operate off the idle position, thereby increasing the range available for deceleration, and thereby increasing the ability to affect the RTA.

The instant invention provides two alternative methods for determining such an off-idle descent path. In a first exemplary approach, the speeds of the descent segments that normally include an idle throttle setting are determined with the throttle at an idle plus some arbitrary throttle increment. For constant speed segments, then, the resulting flight path angle will be less steep. For the constant flight path angle decelerations, the resulting decelerations will occur more slowly. As a result, this approach ensures adequate control authority throughout the descent phase while the descent profile appears substantially unchanged to the pilot. In accordance with this method, the off-idle thrust may be determined in accordance with the following exemplary relationship:

$$\Delta Thrust = GrossWeight * DensityRatio * Constant.$$

This thrust increment is added to the model produced idle thrust to produce a commanded thrust level for predicting the descent path. The Constant described above may be determined through empirical testing to produce a suitable control response margin.

In a second exemplary approach, the unconstrained portion of the descent may be planned with a constant flightpath angle. The flightpath angle may be chosen to be more shallow than the shallowest idle descent flightpath angle conventionally anticipated for the descent.

Similar to the adjustments provided in descent, the instant invention provides for Off-Idle engine operation during other deceleration segments. The deceleration segments prior to speed constraints or speed transitions prefer special attention in both prediction and control to ensure that the aircraft arrives on time. To achieve improved accuracy, the deceleration segments may be predicted and flown with off-idle thrust to allow accurate speed control during the deceleration. The speed command may be determined dynamically during the deceleration and passed to the autothrottle incrementally to prevent the autothrottle from commanding an idle thrust. In accordance with this embodiment, the speed target during the deceleration segment may be determined according to the method described below.

First, the deceleration rate may be determined based upon the entry and exit speeds from each phase and the length of each phase in accordance with the following exemplary relationship:

$$A = (V_2^2 - V_1^2)/(2*L).$$

Then, the current speed target may be determined based upon the distance the aircraft has progressed through the phase in accordance with the following exemplary relationship:

$$Vtgt = SQRT(2*A*D + V_1^2)$$

Where:

$V1$ represents the initial true airspeed at the beginning of the deceleration expressed in units of ft/s;

$V2$ represents the final true airspeed at the end of the deceleration expressed in units of ft/s;

Vtgt represents the target true airspeed along the deceleration expressed in units of ft/s;

A represents the planned constant deceleration along the segment expressed in units of ft/s$^2$, and expressed as a negative value indicating deceleration;

L represents the horizontal distance traveled along the deceleration segment expressed in units of ft; and D represents the horizontal distance traveled along the decel segment expressed in units of ft.

In yet another embodiment of the instant invention, the Descent Speed and Path May be modified. In accordance with this embodiment, if the aircraft is in cruise and is still greater than a predetermined distance, for example 500 nautical miles, from its destination, then the descent may be planned at ECON speed and the RTA may be met by adjusting cruise speed. As a result, interactions between RTA in descent and other mission peculiarities such as step climbs may be prevented. In addition, this embodiment reserves additional flexibility in the form of the descent speed adjustment for ensuring the achievement of the RTA.

In accordance with this embodiment, the descent speed adjustment system and method may be enacted as soon as the aircraft reaches the point where the flight management system may no longer consider a step climb. Further, the descent speed may only be modified in the region of descent that has no speed constraints, either by speed transitions or waypoints with speed constraints. In addition, the descent M and CAS may be coordinated with the cruise speed to provide a consistent mission as disclosed in greater detail below.

The descent path may then be redetermined as the descent speed changes and the top, or point of initiation, of descent moves.

Typically, as an aircraft approaches the point of initiation of its descent, its descent path has already been determined and may not be adjusted significantly. As discussed above, the instant invention enables the descent speed to be adjusted to meet an RTA, without changing the descent path. Thus, if the descent speed changes significantly from the speed at which the descent path was planned, then it may be necessary to adjust the deceleration at the end of the speed adjustment region. The instant invention therefore contemplates planning a new descent path at the new speed and comparing the new path to the current descent path to determine where to implement the new descent path and start the deceleration.

In yet another exemplary embodiment, the instant invention coordinates the descent M and CAS with the cruise speed to provide a consistent mission. To accomplish this, the instant invention modifies the speeds in a coordinated fashion from the ECON speeds. As a result, both speeds are adjusted in accordance with a constant ratio chosen to simultaneously maximize both speeds.

In yet another exemplary embodiment, an earliest RTA determination is provided to ensure that the aircraft will not compromise the fuel reserves required at the destination by exceeding reasonable speed limitations. To accomplish this, a maximum speed mission is first determined. It is then determined whether the maximum speed mission burns excessive fuel, causing the fuel reserves to be unreasonably depleted. If this is the case, an iterative search is performed to find the maximum speed mission that results in adequate reservation of fuel at the destination.

The single waypoint RTA determination method may be extended for multiple RTA waypoints. The instant invention accommodates multiple waypoints while providing the ability to optimize the speed profile with additional functional logical constraints. In accordance with this aspect, the instant invention accommodates such logical constraints as "AT-OR-BEFORE" and "AT-OR-AFTER" RTAs. The operation of these constraints are as they appear. Further, in situations where all of the RTA waypoints are AT constraints, then the system simply loops to determine a speed adjustment for each RTA phase. However, if some of the constraints are AT-OR-BEFORE or AT-OR-AFTER, then the system is free to derive an optimum solution that may not touch all the constraint boundaries. Thus, rather than meeting all of the RTA constraints exactly, the system may find it preferable to ignore some of them. The criteria that this invention may use to optimize the speed profile is based on the assumption that a constant speed adjustment across multiple RTA phases will achieve the most desirable mission for both fuel consumption and ride quality.

For example, in this exemplary embodiment, if a flight plan is constrained to achieve two RTA waypoints where the first RTA waypoint is defined as an AT-OR-BEFORE constraint, and the second RTA waypoint is defined as an AT constraint, the system will first ignore the first RTA waypoint because it is not an AT constraint, and it will try to fly a constant speed adjustment for both phases. If the first RTA constraint is not met by doing this, the system will then consider and satisfy that waypoint, determining a separate speed adjustment for each phase. On subsequent determinations, the activity of each RTA waypoint is defaulted to the prior state. If an RTA constraint is not met, it is reconsidered.

In addition, the instant invention includes means to detect whether an RTA waypoint is necessary or merely redundant. This is accomplished by comparing the speed adjustments between successive RTA phases. If the system commands an increase in speed where an AT-OR-BEFORE RTA waypoint is crossed, then that waypoint may be considered redundant and may be ignored. As a result, the speed for that phase will increase and the aircraft will reach the waypoint early. Similarly, if the system commands a deceleration where an AT-OR-AFTER RTA waypoint is crossed, then that waypoint may be considered redundant and may also be ignored.

For multiple RTA waypoints, the earliest and latest times for each RTA waypoints may be determined separately. The earliest and latest times are determined assuming that all prior RTA waypoint constraints are met. For example, if the first RTA waypoint is an AT constraint, the determination for the second RTA waypoint assumes that the first RTA waypoint will be achieved. If the first RTA waypoint is an AT-OR-BEFORE constraint, then the determination of the times for the second RTA waypoint will allow the first phase to achieve maximum speed, but will not decelerate below the speed that meets the AT part of the constraint. This determination method is accomplished by determining the minimum and maximum ETEs for each RTA phase, then selectively adding up the ETEs in such a way to achieve the above objectives.

Figure 5:
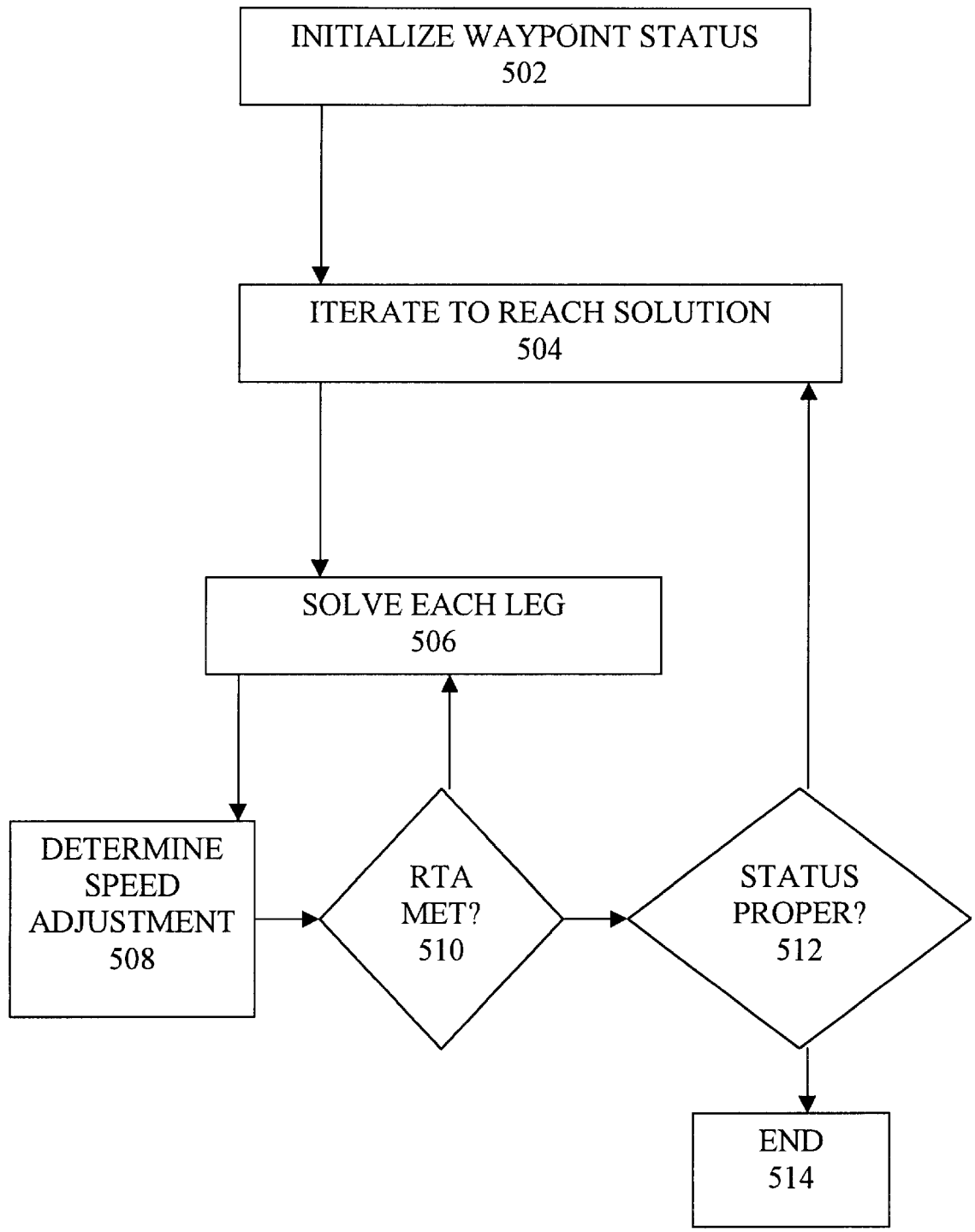

FIG. 5 describes an exemplary method employed by a speed adjustment generator 238 to accommodate multiple RTA waypoints. As shown in FIG. 5, the speed adjustments between multiple RTA waypoints may be determined by, first, initializing each of the waypoints to either an active status or an inactive status (step 502). This status may be designed to depend upon the status of the previously determined RTA waypoint or to depend upon the status declared in the most recent pass. Then, the system iterates until the active RTA waypoints no longer change substantially from iteration to iteration, or in other words, until a converged solution is determined (step 504). Within each of the iterative loops of step 504, a solution is determined for each of the RTA legs (step 506). Within this pass, the speed adjustment for each active RTA is determined (step 508) after which it is determined whether the last RTA waypoint has been reached (step 510). If the last RTA waypoint has not been reached as determined in step 510, then the iterative loop described in steps 506 through 510 is continued until such time as the last RTA waypoint has been reached. When that occurs, it is determined whether any inactive waypoints must be activated, and whether any active waypoints must be deactivated (step 512). If it is found that either of these determinations has returned a positive result (step 512), then control is returned to step 504 for another pass through the iterative loop of steps 504 through 512. If, however, it is determined in step 512 that no inactive waypoints must be activated, and no active waypoints must be deactivated, then the determination of the speed adjustment for multiple RTA waypoints is terminated (step 514).

In essence, the exemplary method described in FIG. 5 comprises two repeating logical paths encompassing the normal determination of the speed adjustment for a single waypoint as described in FIG. 4. The inner loop (e.g., steps 506 through 510) represents the separate determination of the speed adjustment for each active RTA leg. The outer loop (e.g., steps 504 through 512) determines if the appropriate RTA waypoints are active and redetermines the speed adjustments if necessary.

Figure 6:
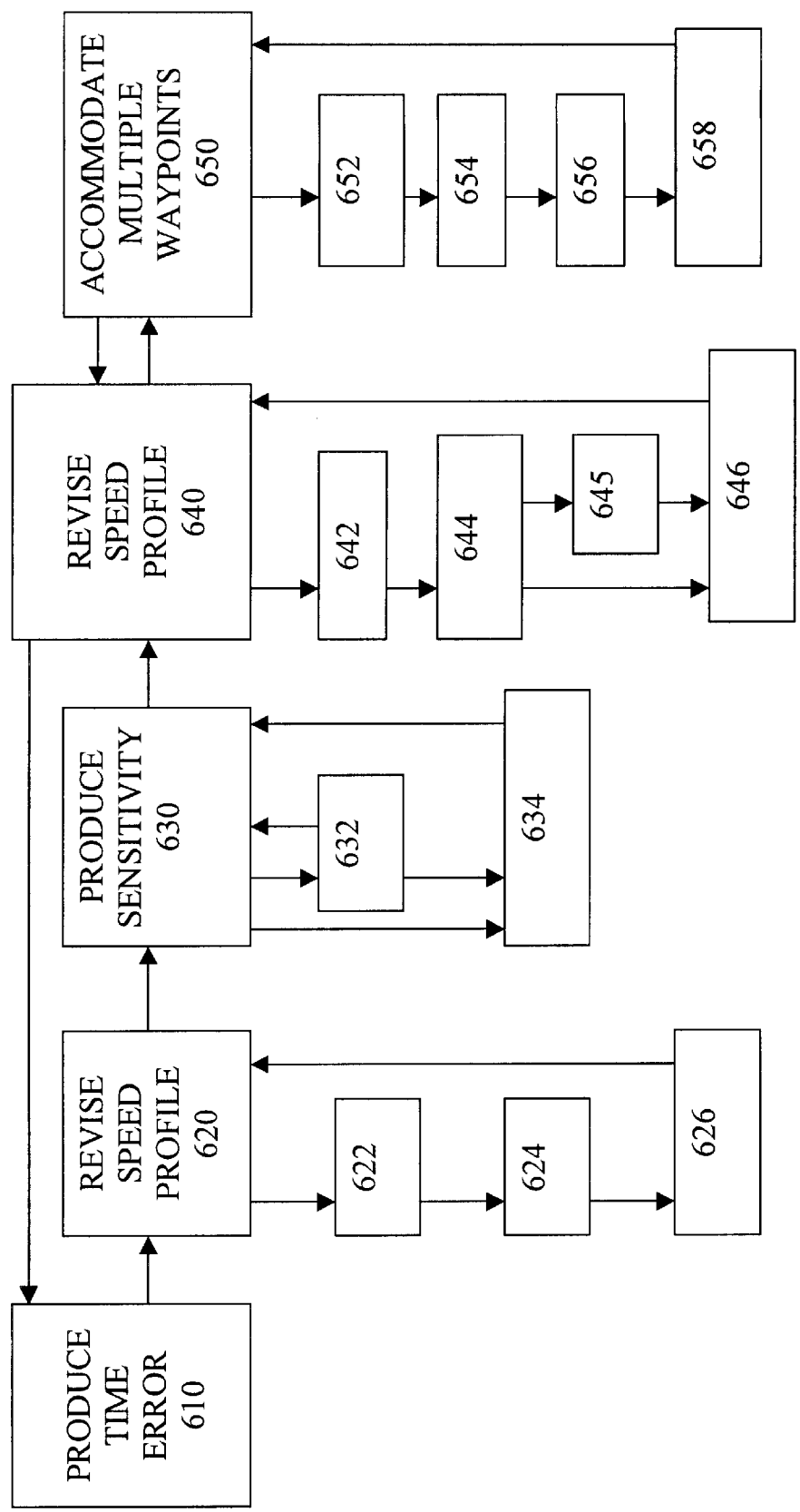

FIG. 6 depicts another exemplary method of controlling the flight of an aircraft to cause the aircraft to reach a waypoint substantially at a predetermined time. As shown in FIG. 6, a time error signal is produced in response to a required time of arrival signal and a speed profile signal (610). Next, a speed profile signal is revised in response to the time error signal (620). Then, in response to the revised speed profile signal, a sensitivity signal is produced (630). Finally, the speed profile signal is revised in response to the sensitivity signal (640). The step of producing or revising the speed profile signal may include the steps of estimating a speed adjustment increment (642), estimating the sensitivity of the time error to changes in the speed adjustment increment (644), and determining a refined speed adjustment increment (646). Still further, the step of estimating a sensitivity may be accomplished by determining a variability of the sensitivity (645). As discussed herein, the speed profile signal may be determined, produced or revised according to various methods that are known in the art including a constant true airspeed method (622), a percentage airspeed method (624), a cost index method (626) or the like. In some situations, it is desirable to detect variations in the sensitivity signal and produce a variability signal that represents those variations (632). Still further, minimum and maximum speed adjustment signals may be produced and/or used to limit speed adjustments (634).

As discussed herein, the method of the instant invention may accommodate a single RTA waypoint or a plurality of waypoints. To accommodate multiple waypoints, the step of producing a speed profile signal may include initializing a status for each waypoint to either an active status or an inactive status (650) and revising the speed profile signal for each active waypoint (652). Then, it may be determined whether the status of each waypoint is proper (654), and the status of each improperly statused waypoint may be corrected (656). Finally, these steps may be repeated until the status of each waypoint is proper (658).

In sum, the invention disclosed herein provides a time of arrival control system that eliminates the deficiencies of the prior art discussed above. As a result, the. instant invention reduces air traffic control workload by maximizing leverage of advanced air traffic control tools and onboard or ground-based conflict detection and resolution equipment. The method of the instant invention incrementally adjusts and refines its speed profile, searching for a satisfactory solution using the sensitivity of the estimated time of arrival to changes in a speed adjustment parameter to quickly, accurately, and reliably determine that solution. Several exemplary methods are disclosed for determining this sensitivity. For example, one exemplary method disclosed herein includes the use of a refined relationship to determine the expected time of arrival, and also includes a summation of the sensitivities of the time of arrival to changes in speed over the full mission, including climb and descent. In the instant invention, several choices for the method of speed modulation are disclosed and accommodated, provided that the speed profile in the mission is affected by the speed adjustment, which affectivity enables the determination of the sensitivity of the ground speed to changes in the speed adjustment. The main benefit of this new system and method is that the speed adjustment for climb and descent flight segments can be determined quickly and efficiently for an RTA waypoint anywhere in the flight plan. To facilitate the tracking of speed changes while in descent, the descent path may be planned with an off-idle throttle selling. As a result, when the aircraft is in descent, speed may be modulated with throttle adjustments.

Also, the instant invention modifies the planned path in descent to avoid, with enhanced margin, aircraft operational limitations. In this way, the instant invention decreases the likelihood of nonlinearities that may result from interferences with aircraft operational limitations. So, it is more likely that with this system an RTA in descent will be met because the speed will be less likely to be limited by any aircraft operational limitations.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

Persons skilled in the art will recognize that the systems and methods of the instant invention may be implemented using other configurations than those shown and discussed above. While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. All such modifications are within the scope of the present invention, which is limited only by the claims which follow.

What is claimed is:

1. A system for controlling the flight of an aircraft to enable the aircraft to reach a waypoint substantially at a predetermined time, the system comprising a speed profile generator in communication with a trajectory generator; said speed profile generator configured to receive a nominal speed command signal, a time error signal and a sensitivity signal and to produce a speed profile signal in response to said nominal speed command signal, said time error signal and said sensitivity signal; said trajectory generator configured to receive said speed profile signal and a required time of arrival signal to produce a time error signal and a sensitivity signal in response to said speed profile signal and said required time of arrival signal, said sensitivity signal representing the sensitivity of said time error signal to changes in said speed profile signal.

2. The system of claim 1 wherein said trajectory generator is configured to receive an atmospheric condition signal and produce said time error signal in response to said atmospheric condition signal.

3. The system of claim 1 wherein said trajectory generator is configured to receive an atmospheric condition signal and produce said sensitivity signal in response to said atmospheric condition signal.

4. The system of claim 1 further comprising a descent path planner in communication with said trajectory generator.

5. The system of claim 4 wherein said descent path planner modifies said speed profile signal to enable the aircraft to descend with an engine throttle setting greater than idle.

6. The system of claim 5 wherein said speed profile signal enables the aircraft to decelerate with an engine throttle setting greater than idle.

7. The system of claim 1 wherein said trajectory generator includes a descent path planner.

8. The system of claim 1 wherein said speed profile signal includes a climb phase segment.

9. The system of claim 8 wherein said speed profile signal is configured to enable the aircraft to reach a waypoint substantially at a predetermined time during the climb phase.

10. The system of claim 9 wherein the speed profile signal is modified while the aircraft's position is increasing in altitude.

11. The system of claim 1 wherein said speed profile signal includes a descent phase segment.

12. The system of claim 11 wherein said speed profile signal is configured to enable the aircraft to reach a waypoint substantially at a predetermined time while the aircraft's position is decreasing in altitude.

13. The system of claim 12 wherein the speed profile signal is modified while the aircraft's position is decreasing in altitude.

14. The system of claim 1 wherein said trajectory generator detects a variation in said sensitivity signal and produces a variability signal in response to said variation.

15. The system of claim 14 wherein said speed profile generator is configured to receive said variability signal and produce said speed profile signal in response to said variability signal.

16. The system of claim 1 wherein said speed profile generator comprises a speed adjustment generator in communication with a speed adjuster, said speed adjustment generator configured to receive said time error signal and said sensitivity signal and produce a speed adjustment signal in response to said time error signal and said sensitivity signal, said speed adjuster configured to receive said speed adjustment signal and a nominal speed command signal and produce said speed profile signal in response to said speed adjustment signal and said nominal speed command signal.

17. The system of claim 16 wherein said trajectory generator detects a variation in said sensitivity signal and produces a variability signal in response to said variation.

18. The system of claim 17 wherein said speed profile generator is configured to receive said variability signal and produce said speed profile signal in response to said variability signal.

19. The system of claim 16 wherein said trajectory generator produces a minimum speed adjustment signal.

20. The system of claim 16 wherein said trajectory generator produces a maximum speed adjustment signal.

21. The system of claim 16 wherein said speed profile generator detects whether the aircraft is accelerating or decelerating.

22. The system of claim 1 wherein said trajectory generator determines a difference between said speed profile signal and a predetermined limit, and produces said sensitivity signal responsive to said difference.

23. The system of claim 22 wherein said trajectory generator produces a sensitivity signal for acceleration and a sensitivity signal for deceleration.

24. The system of claim 23 wherein said speed profile generator determines the sense of said time error signal and produces a speed profile signal responsive to said sense.

25. The system of claim 23 wherein said trajectory generator produces a first speed profile signal for deceleration and a second speed profile signal for acceleration.

26. The system of claim 25 wherein said trajectory generator produces a plurality of anticipatory sensitivity signals based on comparison of said first speed profile signal and said second speed profile signal to at least one predetermined limit.

27. The system of claim 26 wherein said speed profile generator determines the sense of the time error signal and applies a sensitivity signal in response to said sense and said anticipatory sensitivity signals.

28. The system of claim 1 wherein said speed profile generator determines a difference between said speed profile signal and a predetermined limit and generates a signal in response to said difference.

29. The system of claim 1 wherein said speed profile generator performs reasonableness checks on said sensitivity signal.

30. The system of claim 1 wherein said speed profile signal is based on a refined sensitivity signal.

31. The system of claim 1 wherein said speed profile generator accommodates at least one required time of arrival waypoint.

32. The system of claim 1 wherein said speed profile generator is configured to accommodate a plurality of required time of arrival waypoints.

33. The system of claim 32 wherein said speed profile generator performs a first operation including initializing a status for each waypoint to either an active status or an inactive status and revising said speed profile signal for each waypoint having an active status; performs a second operation comprising determining whether the status of each waypoint is proper and correcting the status of each improperly statused waypoint; and performs a third operation comprising repeating said first operation and said second operation until the status of each waypoint is proper.

34. A method of controlling the flight of an aircraft to cause the aircraft to reach a waypoint substantially at a predetermined time, the method comprising:
   producing a time error signal in response to a required time of arrival signal and a speed profile signal,
   revising said speed profile signal in response to said time error signal,
   producing a sensitivity signal in response to said revised speed profile signal, and
   further revising said speed profile signal in response to said sensitivity signal,
   wherein said further revising said speed profile signal comprises:
   estimating a speed adjustment increment,
   estimating a sensitivity of said time error signal to said speed adjustment increment, and
   determining a refined speed adjustment increment,
   wherein said estimating a sensitivity includes determining a variability of said sensitivity.

35. The method of claim 34 wherein said speed profile signal is revised according to a constant true airspeed method.

36. A method of controlling the flight of an aircraft to cause the aircraft to reach a waypoint substantially at a predetermined time, the method comprising:
   producing a time error signal in response to a required time of arrival signal and a speed profile signal,
   revising said speed profile signal in response to said time error signal,
   producing a sensitivity signal in response to said revised speed profile signal, and
   further revising said speed profile signal in response to said sensitivity signal, wherein said speed profile signal is determined according to a percentage airspeed method.

37. A method of controlling the flight of an aircraft to cause the aircraft to reach a waypoint substantially at a predetermined time, the method comprising:
producing a time error signal in response to a required time of arrival signal and a speed profile signal,
revising said speed profile signal in response to said time error signal,
producing a sensitivity signal in response to said revised speed profile signal,
further revising said speed profile signal in response to said sensitivity signal,
detecting variations in said sensitivity signal and producing a variability signal in response thereto.

38. The method of claim 37 further comprising producing a minimum speed adjustment signal.

39. The method of claim 37 further comprising producing a maximum speed adjustment signal.

40. A method of controlling the flight of an aircraft to cause the aircraft to reach a waypoint substantially at a predetermined time, the method comprising:
producing a time error signal in response to a required time of arrival signal and a speed profile signal,
revising said speed profile signal in response to said time error signal,
producing a sensitivity signal in response to said revised speed profile signal, and
further revising said speed profile signal in response to said sensitivity signal,
wherein said step of revising said speed profile signal includes:
a first operation including initializing a status for each waypoint to either an active status or an inactive status and revising said speed profile signal for each waypoint having an active status,
a second operation comprising determining whether the status of each waypoint is proper and correcting the status of each improperly statused waypoint, and
a third operation comprising repeating said first operation and said second operation until the status of each waypoint is proper.

* * * * *